United States Patent
Polaganga et al.

(10) Patent No.: US 12,471,125 B2
(45) Date of Patent: Nov. 11, 2025

(54) SYSTEMS AND METHODS FOR MANAGING WIRELESS COMMUNICATION BASE STATION RADIO FREQUENCY (RF) BAND USAGE BY NETWORK ACCESS DEVICES

(71) Applicant: T-MOBILE INNOVATIONS LLC, Overland Park, KS (US)

(72) Inventors: Roopesh Kumar Polaganga, Bothell, WA (US); Sanjay Baburao Waje, Plano, TX (US)

(73) Assignee: T-Mobile Innovations LLC, Overland Park, KS (US)

( * ) Notice: Subject to any disclaimer, the term of this patent is extended or adjusted under 35 U.S.C. 154(b) by 362 days.

(21) Appl. No.: 18/296,252

(22) Filed: Apr. 5, 2023

(65) Prior Publication Data
US 2024/0340940 A1  Oct. 10, 2024

(51) Int. Cl.
| | |
|---|---|
| H04W 16/10 | (2009.01) |
| H04W 24/00 | (2009.01) |
| H04W 24/08 | (2009.01) |
| H04W 28/04 | (2009.01) |
| H04W 72/04 | (2023.01) |
| H04W 72/54 | (2023.01) |

(52) U.S. Cl.
CPC ........... *H04W 72/54* (2023.01); *H04W 24/08* (2013.01)

(58) Field of Classification Search
CPC ...... H04W 72/54; H04W 24/08; H04W 24/02
USPC ...................................................... 455/452.2
See application file for complete search history.

(56) References Cited

U.S. PATENT DOCUMENTS

| | | | | |
|---|---|---|---|---|
| 2009/0245155 A1* | 10/2009 | Fukunaga | ............. | H04W 72/30 370/312 |
| 2010/0034108 A1* | 2/2010 | Ode | ...................... | H04W 72/02 370/252 |
| 2011/0130160 A1* | 6/2011 | Miyata | ................ | H04W 72/046 455/562.1 |
| 2012/0077445 A1* | 3/2012 | Konno | .................. | H04L 5/0094 455/67.11 |

(Continued)

OTHER PUBLICATIONS

IP.com Search History (Year: 2025).*

(Continued)

*Primary Examiner* — Moustapha Diaby
(74) *Attorney, Agent, or Firm* — Shook, Hardy & Bacon L.L.P.

(57) ABSTRACT

Systems and methods for managing wireless communication base station radio frequency (RF) band usage by network access devices are provided. One or more of the embodiments address the problem network service degradations caused by unauthorized relocation of fixed wireless access (FWA) devices. More specifically, one or more of the embodiments described herein provide for a guest network access device (GNAD) manager that may monitor usage of a base station coverage RF band layer and use network usage data to detect when a relocated FWA device may be causing a service quality degradation to other UE attached to that base station coverage RF band layer. When the GNAD manager determines that a relocated FWA device is potentially causing a service quality degradation, the GNAD manager may trigger a reconfiguration of the relocated FWA device that disables the ability of the relocated FWA device to attach to the coverage RF band layer.

20 Claims, 7 Drawing Sheets

(56) References Cited

U.S. PATENT DOCUMENTS

| | | | | |
|---|---|---|---|---|
| 2013/0183993 | A1* | 7/2013 | Ishii | H04W 24/00 455/552.1 |
| 2013/0208615 | A1* | 8/2013 | Ishikura | H04W 24/10 370/252 |
| 2015/0050941 | A1* | 2/2015 | Sawada | H04W 72/0453 455/452.2 |
| 2016/0183220 | A1* | 6/2016 | Rashid | H04W 72/23 370/329 |
| 2019/0312687 | A1* | 10/2019 | Andreoli-Fang | H04L 1/1893 |
| 2020/0120582 | A1* | 4/2020 | Yang | H04W 72/0453 |
| 2021/0067918 | A1* | 3/2021 | Baek | H04W 72/21 |
| 2021/0076280 | A1* | 3/2021 | Nord | H04W 36/0085 |
| 2021/0185636 | A1* | 6/2021 | Moon | H04W 76/11 |

OTHER PUBLICATIONS

Fisher, Tim, "Mobile 5G vs Fixed 5G," Lifewire, https://www.lifewire.com/5g-fixed-wireless-fwa-4178934?print, Jan. 18, 2023, 6 pages.
Gallo, Emie, "5G FWA For the Last Mile," ISE ICT Solutions & Education, https://www.isemag.com/print/content/14266401, Dec. 1, 2021, 5 pages.
Leigh, Jason, "5G Fixed Wireless Accelerates Connectivity Options for Business," IDC Analyst Brief, Sponsored by: T-Mobile for Business, Sep. 2022, 7 pages.
Roux, Jurie, "5G Challenges: When Fixed Wireless Access Goes Rogue," TEOCO, https://www.teoco.com/blog/5g-chanllenges-when-fixed-wireless-acess-goes-rogue/, Downloaded Feb. 15, 2023, 4 pages.
Thompson, Larry D., "Evaluating the Capabilities of Fixed Wireless Technology to Deliver Gigabit Performance in Rural Markets," Vantage Point, Feb. 2021, 19 pages.
Unknown, "What is fixed wireless access (FWA) technology?," https://www.verizon.com/about/blog/fixed-wireless-access, Downloaded Apr. 3, 2023, 6 pages.

* cited by examiner

SYSTEMS AND METHODS FOR MANAGING WIRELESS COMMUNICATION BASE STATION RADIO FREQUENCY (RF) BAND USAGE BY NETWORK ACCESS DEVICES

BACKGROUND

With the high bandwidths afforded by modern 5G NR wireless telecommunications networks, it has become feasible to provide high speed broadband home internet services to a customer premises wirelessly. That is, as opposed to traditional "wired" broadband services, such as Digital Subscriber Line (DSL) or cable television network internet access technologies, that deliver internet services via a physical cable (e.g., using either electrical conductors and/or optical fibers), 5G wireless based home internet services may utilize a network access device installed on the customer premises to provide internet service to both wired and wireless user equipment (UE) at the customer premises. Such a network access device, often referred to as a Fixed Wireless Access (FWA) device, essentially operates as an extended node of the 5G NR wireless telecommunications network by establishing a wireless connection with a high bandwidth capacity layer (e.g., RF band) via a nearby 5G cellular base station (e.g., a cell cite), and distributing access to network services to network devices (e.g., wired and/or wireless UE) within the customer premises local network. Although a FWA device generally has a form factor that makes it easy to move from location to location, they are typically deployed by the network operator to a single authorized customer premises with the intention and understanding that the FWA device will remain at the authorized location to provide service to the intended customer premises. Since an FWA device constitutes a potentially substantial user of capacity layer bandwidth available from a 5G NR cellular base station, the network operator takes into account the number and location of FWA devices authorized for use at each 5G NR cellular base station when performing network planning to ensure that individual 5G NR cellular base station will maintain sufficient capacity to serve expected numbers of both mobile UE and FWA devices.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

One or more of the embodiments of the present disclosure provide for, among other things, solutions that address the problem network service degradations caused by unauthorized relocation of fixed wireless access (FWA) devices. More specifically, one or more of the embodiments described herein provide for a guest network access device (GNAD) manager that may monitor usage of a base station coverage RF band layer. The GNAD manager can use network usage data to detect when a relocated FWA device may be causing a service quality degradation to other UE attached to that base station coverage RF band layer. When the GNAD manager determines that a relocated FWA device is potentially causing a service quality degradation, the GNAD manager may trigger a reconfiguration of the relocated FWA device that disables the ability of the relocated FWA device to attach to the coverage RF band layer. In some embodiments, disabling the ability of the relocated FWA device to attach to the coverage RF band layer may prompt the relocated FWA device to search for a different, higher bandwidth, RF band layer (e.g., such as a capacity layer) more suitable for providing a high throughput connection than the coverage RF band layer. In some embodiments, a GNAD manager may trigger a reconfiguration of a relocated FWA device by causing a network configuration server to send a configuration message to the relocated FWA device to disable support of the coverage RF band layer.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
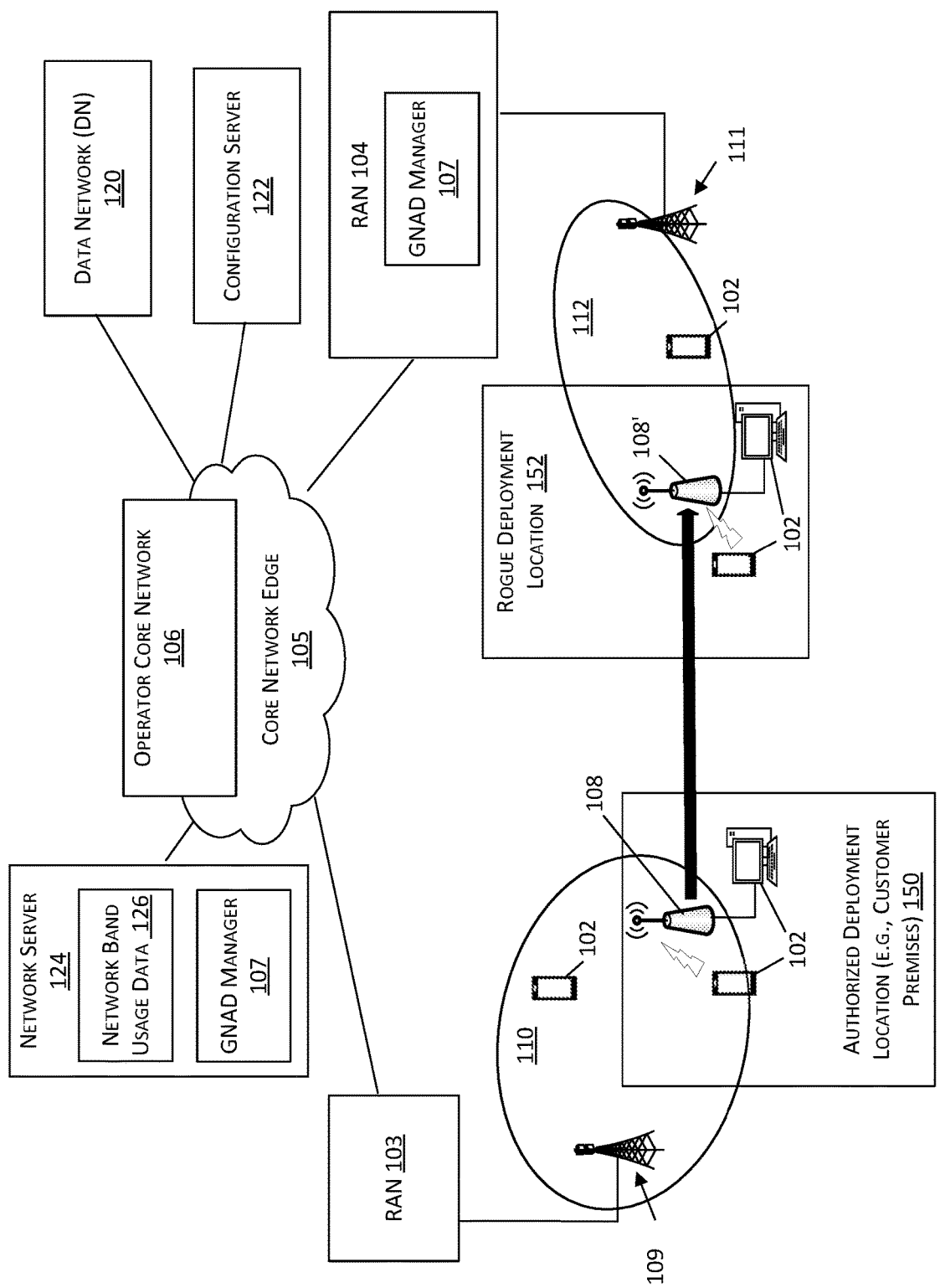
FIG. 1 is a diagram illustrating an example network environment implementing relocated network access device management, in accordance with some embodiments.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

One or more of the embodiments of the present disclosure provide for, among other things, solutions that address the problem of challenges with fixed wireless access (FWA) devices that may arise when a FWA device is removed by a consumer from its authorized deployment location, and without authorization from the network operator, relocated to a rogue deployment location where the activation of the FWA device may result in capacity concerns at the local base station. For example, a FWA device may comprise an access device (e.g., a network access device) that shares connectivity services available through a wireless base station with one or more UE that are in communication with the FWA device. A FWA device is intended to provide high speed broadband home internet services to a customer premises and is therefore typically deployed to a customer premises location that falls within a local cellular base station coverage area for a mid-band or high-band radio frequency (RF) layer (e.g., the 5G NR N41 frequency band) that can provide high bandwidth/high speed connections (e.g., 190-200 MHz bandwidth channels) within a radius of several miles from a cell tower. Such a high speed RF band layer is often referred to as a "capacity layer" of a base station, though a given base station may operate multiple capacity layers over different mid-band or high-band RF bands. A base station may also provide a coverage area for a low-band RF band layer (e.g., the 5G NR N71 frequency band) that may provide a lower speed connection (e.g., 1-15 MHz bandwidth channels) than a mid-band or high-band RF band layer, but may provide that coverage over a comparably substantially more expansive area (e.g., on the order of hundreds of square miles). Such an extended range RF band layer is often referred to as a "coverage layer" of a base station, because it is used to provide a least a minimal level of quality connectivity between a UE and the base station in distant regions where a capacity layer does not reach. When a network operator evaluates authorizing deployment of a FWA to a customer premises, the network operator may evaluate the available bandwidth margin of the capacity layer of the base station serving that area to ensure that deployment of the FWA device does not result in degrading quality of service and/or user experiences (e.g., based on UE usage projections for that base station). To allow for continuity of home internet service at the customer premise, a FWA device may be configured to fall back onto the coverage layer in circumstances where access to the capacity layer is lost (e.g., for planned maintenance occasions or unplanned equipment outages) and return to the capacity layer when access to the capacity layer is re-established.

That said, when an FWA device is relocated to a rogue deployment location, that location may not necessarily fall within the coverage area of a local base station's capacity RF band layer, so that the FWA device instead attaches to the local base station through a coverage RF band layer. Further, in some scenarios, even when a capacity RF band layer becomes available to the FWA device at the rogue deployment location, that FWA device may become effectively stuck on the coverage RF band layer and unable to attach to the capacity RF band layer. For example, an FWA device connected to a coverage RF band layer may, while in idle mode, periodically initiate a search for a local base station capacity RF band layer when the FWA device is camped on the base station in idle mode. When a UE served by the FWA device is instead in connect mode and maintaining an active communication session for an extended duration of time (e.g., receiving a streaming video from a movie service, or where a connected IoT device is maintaining a continuous session with a back-end server), the FWA device may remain in connect mode (rather than idle mode) and not initiate a search for an available capacity RF band layer as long as a communication session remains active.

As a result of the capacity of the coverage RF band layer being consumed by the relocated FWA device, other UE operating on the coverage RF band layer may experience degradations in service such as, but not limited to, increases in latency, dropped calls, decreased data speeds, and/or other quality of service degradations. Moreover, unauthorized movement of FWA devices negatively affects the accuracy of network capacity studies used for network planning. Since network functions are available to a network operator to determine when an FWA device has relocated, or at least determine when it is attached to a base station other than the base station for the authorized deployment location, one solution could be a blanket prohibition that denies FWA device requests to attach to base stations other than the base station serving the authorized customer premises. However, a blanket prohibition of FWA device relocation could result in an unnecessary complete loss of network access to an FWA device customer even where rogue relocation of an FWA device might not create a situation that causes service degradations to others.

One or more of the embodiments described herein address, among other things, the problems of potential network service degradations caused by unauthorized relocation of FWA devices. More specifically, one or more of the embodiments described herein provide for a guest network access device (GNAD) manager that may monitor usage of a base station coverage RF band layer and use network usage data to determine when a relocated FWA device may be causing a service quality degradation to other UE attached to that base station coverage RF band layer. When the GNAD manager determines that a relocated FWA device is potentially causing a service quality degradation, the GNAD manager may trigger a reconfiguration of the relocated FWA device that disables the ability of the relocated FWA device to attach to the coverage RF band layer. In some embodiments, disabling the ability of the relocated FWA device to attach to the coverage RF band layer may prompt the relocated FWA device to search for a different, higher bandwidth, RF band layer (e.g., such as a capacity layer) more suitable for providing a high throughput connection than the coverage RF band layer. As discussed in greater detail below, a GNAD manager may implement logic to determine when a relocated FWA device is potentially causing service quality degradation on the coverage RF band layer using a network monitoring approach and/or an FWA device monitoring approach. Also as further discussed herein, these embodiments represent an improvement to the underlying communications network with respect to network capacity management by mitigating increased latency, dropped calls, decreased data speeds, and/or other quality of service degradations resulting from unauthorized relocations of FWA devices.

FIG. 1 is a diagram illustrating an example network environment 100 embodiment in which aspects of guest FWA management, may be implemented. Network environment 100 is but one example of a suitable network environment and is not intended to suggest any limitation as to the scope of use or functionality of the embodiments disclosed herein. Neither should the network environment 100 be interpreted as having any dependency or requirement relating to any one or combination of components illustrated.

As shown in FIG. 1, network environment 100 comprises an operator core network 106 (also referred to as a "core network") of a wireless communications network that provides one or more wireless network services to one or more UE 102 within the coverage areas of a plurality of base stations.

UE 102 may in general, comprise forms of equipment and machines such as but, not limited to, Internet-of-Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, UE 102 may include computing devices such as, but not limited to, handheld personal computing devices, cellular phones, smart phones, tablets, laptops, and similar consumer equipment, or stationary desktop computing devices, workstations, servers and/or network infrastructure equipment. As such, the UE 102 may include both mobile UE and stationary UE devices. The UE 102 can include one or more processors, and one or more non-transient computer-readable media for executing code to carry out the functions of the UE 102 described herein. The computer-readable media may include computer-readable instructions executable by the one or more processors. In some embodiments, the UE 102 may be implemented using a computing device 600 as discussed below with respect to FIG. 6. As discussed further below, from the perspective of a base station, an FWA device is essentially a form of UE 102 that is subscribed to network services provided by operator core network 106, is authorized to wirelessly attach to a base station (such as shown at RAN 103 and RAN 104) to access the network, and then shares its network connection with one or more other UE 102, either through a wired connection (e.g., through an Ethernet port) or a wireless connection (e.g., through a IEEE 802.11 (WiFi) connection and/or IEEE 802.15 (Bluetooth) connection).

In particular, operator core network 106 provides combinations of network services to UE 102 for at least one public land mobile network (PLMN) which UE 102 may attach to via channels of one or more RF bands (referred to herein as RF band layers), which may include at least one capacity RF band layer and at least one coverage RF band layer. The capacity RF band layer may comprise a higher bandwidth communication channel to UE 102 than the coverage RF band layer, though may have a smaller effective coverage area. In general, the capacity RF band layer may operate at a high frequency RF band than the coverage RF band layer.

Base stations, such as the base stations shown at 103 and 104, are often individually referred to as a radio access network (RAN) and/or a wireless communication base station system. In the embodiment shown in FIG. 1, RAN 103 may function as an access node via which the UE 102 within coverage area 110 can wirelessly access services of the operator core network 106, such as telecommunications and data connectivity. Similarly, RAN 104 may function as an access node via which the UE 102 within coverage area 112 can wirelessly access services of the operator core network 106, such as telecommunications and data connectivity. In the context of fourth generation (4G) Long Term Evolution (LTE), a RAN 103 and/or RAN 104 may be referred to as an eNodeB, or eNB. In the context of fifth generation (5G) New Radio (NR), a RAN 103 and/or RAN 104 may be referred to as a gNodeB, or gNB). Other terminology may also be used depending on the specific implementation technology. As such, in some embodiments network environment 100 comprises, at least in part, a wireless communications network. In this disclosure, RAN 103 and/or RAN 104 may also more generally be referred to as a macro RAN (which may also be referred to as a macro access node, macrocell, and/or macro base station). In general, a macro RAN typically comprises arrays of tower or building mounted antenna that provide a coverage area that may extend, for example, one to several miles or more.

In some embodiments, RAN 103 and/or RAN 104 may each comprise a multi-modal network (for example comprising one or more multi-modal access devices) where multiple radios supporting different systems are integrated into the radio of the RAN 103 and/or RAN 104. Such a multi-modal RAN may support a combination of 3GPP radio technologies (e.g., 4G, 5G and/or 6G) and/or non-3GPP radio technologies. A PLMN layer of the core network 106 may comprise PLMN sub-layers corresponding to such radio technologies. In particular, individual UE 102 may communicate with the operator core network 106 via a RAN (such as RAN 103 and/or RAN 104) over one or both of uplink (UL) RF signals and downlink (DL) RF signals. In some embodiments, each protocol data unit (PDU) session between a UE 102 and the operator core network 106 through a RAN may be associated with a network slice and/or assigned a single network slice selection assistance information (S-NSSAI) identifier that may be unique within the context of the PLMN layer.

The RAN 103 and/or RAN 104 may be coupled to the operator core network 106 via a core network edge 105 that comprises wired and/or wireless network connections that may themselves include wireless relays and/or repeaters. In some embodiments, RAN 103 and/or RAN 104 is coupled to the operator core network 106 at least in part by a backhaul network such as the Internet or other public or private network infrastructure. The core network edge 105 may comprise one or more network nodes or other elements of the operator core network 106 that may define the boundary of the operator core network 106 and may serve as the architectural demarcation point where the operator core network 106 connects to other networks such as, but not limited to RAN 103, RAN 104, the Internet, or other third-party networks. It should be understood that in some aspects, the network environment 100 may not comprise a distinct network operator core network 106, but rather may implement one or more features of the network operator core network 106 within other portions of the network, or may not implement them at all, depending on various carrier preferences.

The network environment 100 is generally configured for wirelessly connecting UEs 102 to other UEs 102 via RAN 103, via RAN 104, via other RAN and/or other local wireless cellular access points, and/or via other telecommunication networks or a publicly-switched telecommunication network (PSTN), for example. The network environment 100 may be generally configured for wirelessly connecting a UE 102 to data or services that may be accessible on one or more application servers or other functions, nodes, or servers. The operating environment 100 may be generally configured, in some embodiments, for wirelessly connecting UE 102 to data or services that may be accessible on one or more application servers or other functions, nodes, or servers (such as services provided by servers of a data network (DN) 120, for example).

As discussed above, in some embodiments, the network environment 100 may include at least one UE 102 that comprises a network access device, such as the FWA device 108 shown in FIG. 1. In this example, the FWA device 108 is installed at an authorized deployment location 150, which may comprise a customer premises within which the network operator of operator core network 106 has authorized the FWA device 108 to be installed. From the authorized deployment location 150, the FWA device 108 may operate within coverage area 110 and attach to RAN 103 (e.g., via a capacity RF band layer) to access network services of the operator core network 106. The FWA device 108 functions as an access device to share connectivity services available through RAN 103 with one or more UE 102 that are in communication with the FWA device 108.

As discussed above, the network operator, when evaluating whether to authorize deployment of the FWA device 108 to the authorized deployment location 150, may perform a capacity study to confirm that RAN 103 has an adequate capacity margin to support the addition of FWA device 108.

The network operator may also account for projected network resource usage consumed by FWA device 108 in future network planning studies.

Challenges with FWA devices may arise when an FWA device is removed by a consumer from its authorized deployment location, and relocated to a rogue deployment location. For example, referring to FIG. 1, a consumer may remove FWA device 108 from the authorized deployment location 150 where it attaches to the capacity RF band layer of RAN 103, and relocate FWA device 108 to a rogue deployment location 152. From the rogue deployment location 152, the FWA device 108 may now fall within a different coverage area 112 of RAN 104 so that when activated, the FWA device 108 attaches to the RAN 104. Moreover, the now relocated FWA device 108 (indicated in FIG. 1 as FWA device 108') may be located in a region of coverage area 112 where a capacity RF band layer is not available, so that the relocated FWA 108' attaches to RAN 104 through a coverage RF band layer. Alternatively, the relocated FWA device 108' may be located in a region of coverage area 112 where a capacity RF band layer is available, but non-the-less initially attaches to the coverage RF band layer of RAN 104, enters connected mode and establishes an active protocol data unit (PDU) session (e.g., with an application server on DN 120), and is therefore unable to initiate a search to re-attach itself to the capacity RF band layer available from RAN 104. Because the relocation of FWA 108 from the authorized deployment location 150 to the rogue deployment location 152 is not an evolution accounted for by the network operator's network planning studies, the activation of the relocated FWA device 108' may result in capacity concerns at the local RAN 104, and service disruptions and/or service degradations to regular UE users of RAN 104 that rely on the network access provided by the coverage RF band layer of RAN 104.

One or more of the embodiments described herein address, among other things, the problems of potential network service degradations caused by such unauthorized relocation of FWA devices using a guest network access device (GNAD) manager 107 that may determine when a relocated FWA device (e.g., such as FWA device 108') is potentially causing a service quality degradation on the coverage RF band layer of a base station (e.g., such as RAN 104) from a rogue deployment location. As shown in FIG. 1, in some embodiments, a GNAD manager 107 may be implemented on a RAN element of a network (e.g., such as RAN 104), and/or a network server 124 accessible by RAN 104. In some embodiments, the execution of operations of a GNAD manager 107 as described herein may be distributed between multiple elements of the network environment 100 (e.g., distributed between RAN 104 and a network service 124). In some embodiments, one or more aspects of a GNAD manager 107 may be at least in part incorporated within, and implemented by, a FWA device. A GNAD manager 107 may be implemented at least in part using a computing device 600 as discussed below with respect to FIG. 6, and/or a cloud computing platform 710 as discussed below with respect to FIG. 7.

The GNAD manager 107 may monitor usage of the coverage RF band layer of RAN 104 and use network usage data to determine when a relocated FWA device may be causing a service quality degradation to other UE 102 within coverage area 112 attached to that coverage RF band layer. For example, in some embodiments, the GNAD manager 107 may determine if relocated FWA device 108' is a heavy consumer of bandwidth on the coverage RF band layer (which is a limited capacity RF band layer) that could end up impacting regular UE 102 users. For example, the RAN 104, due to bandwidth consumption by the relocated FWA device 108', may withhold allocation of resources to other UE 102 on the coverage RF band layer due to overall congestion even though RF conditions are otherwise favorable to supporting those UE 102. In some embodiments, the GNAD manager 107 may monitor RF band usage statistics for the coverage RF band layer of RAN 104 and from the RF band usage statistics determine when at least one UE attached to the coverage RF band layer of RAN 104 may be causing potential service quality degradation. In some embodiments, such RF band usage information may collected by functions of the operator core network 106 and stored to a network server 124 as network band usage data 126, from which it may be read by the GNAD manager 107.

When the GNAD manager 107 determines that the relocated FWA device 108' is potentially causing a service quality degradation, the GNAD manager 107 may trigger a reconfiguration of the relocated FWA device 108' that disables the ability of the relocated FWA device 108' to attach to the coverage RF band layer. For example, the FWA device may comprise a registry that include a prioritized listing of several RF band layers that the FWA device supports and/or is authorized to use for wireless connectivity services. Reconfiguration of the relocated FWA device 108' to disable the ability of the relocated FWA device 108' to attach to the coverage RF band layer of RAN 104 may comprise removing a code or identifier of the coverage RF band layer of RAN 104 from the listing of RF band layers that the FWA device supports and/or otherwise indicating on the registry that the coverage RF band layer of RAN 104 is not an RF band layer that the FWA is authorized to use.

In some embodiments, the GNAD manager 107 may monitor RF band usage indicators (which may be referred to as key performance indicators (KPI)) for the coverage RF band layer of RAN 104. For example, RF band usage indicators may include, or may be derived from, call data records (CDRs), event data records (EDRs), and/or location service records (LSR), for example. CDRs, EDRs and LSR are examples of records collected and maintained by the operator core network 106 that provide radio network related details for PDU session transactions for individual UE 102 that use services of the operator core network 106 and may be used by the GNAD manager 107 to identify RF band usage statistics for the coverage RF band layer of RAN 104 and/or individual UE 102 attached to the coverage RF band layer (both for regular (e.g., mobile) UE and for UE that comprise FWA devices). For example, CDRs and EDRs may show how much bandwidth is being used by individual UE (including UE that comprise FWA devices) at specific times, and the type of data being transported. LSR may show the location of UE (including UE that comprise FWA devices) when initiating PDU session and how long those sessions last and a category of the UE type conducting the session (e.g., whether a mobile UE device or a FWA device).

RF band usage indicators monitored by the GNAD manager 107 for RAN 104 may provide RF band usage information such as, but not limited to, call trace data, per call measurement data (PCMD), active session statistics, RF signal measurement reports and/or voice quality metrics, video stream freeze rates, video stream start rates, voice loss rates, video loss rates, dropped call rates, bandwidth utilization of the RF band layers available via RAN 104, UE data throughput, data rates, UE average signal to noise ratio (SNR), UE average signal to interference and noise ratio (SINR), latency statistics and/or other quality of service statistics, for example. RF band usage indicators monitored by the GNAD manager 107 may also indicate an amount of time that a UE 102 (including FWA devices such as FWA device 108) are attached to a given RAN and/or to a given RF band layer. In some embodiments, the RF band usage indicators may be aggregated over a predefined aggregation window of time. For example, the GNAD manager 107 may compare one or more RF band usage indicators to historical baselines for those indicators derived for historical non-FWA device UE using the coverage RF band layer to determine an effect of the FWA device 108' attaching to the coverage RF band layer. The GNAD manager 107 may determine that the FWA device 108' is causing a potential service quality degradation for other UE, for example, based on RF band usage indicators crossing a predetermine quality threshold and/or deviating from established historical baselines.

As mentioned above, when the GNAD manager 107 determines that a relocated FWA device 108' is potentially causing a service quality degradation, the GNAD manager 107 may trigger a reconfiguration of the relocated FWA device 108' that disables the ability of the relocated FWA device to attach to the coverage RF band layer. In some embodiments, the GNAD manager 107 may trigger a reconfiguration of the relocated FWA device 108' through a network configuration server 122. For example, in some embodiments, the GNAD manager 107 may use a carrier configuration mechanism (which may be referred to as "carrier config") of the communications network to trigger a reconfiguration of the relocated FWA device 108' with respect to various telephony-related behaviors. A UE connected with the network environment may communicate with the network configuration server 122 (e.g., a carrier config server) on a regular basis to obtain certain carrier specific settings and updates. The network configuration server 122 may push a configuration message (e.g., a carrier config) to an individual UE, and/or the network configuration server 122 may respond to a request from a UE to receive a configuration message. In some embodiments, the GNAD manager 107 may trigger a reconfiguration of the relocated FWA device 108' by causing the network configuration server 122 to send a configuration message to the relocated FWA device 108' and/or other FWA devices operating on the coverage RF band layer of the RAN 104, to disable support of that coverage RF band layer. In some embodiments, the GNAD manager 107 may trigger a reconfiguration of the relocated FWA device 108' by causing the relocated FWA device 108' to request a network configuration server 122 to send a configuration message to the relocated FWA device 108' to disable support of that coverage RF band layer.

In response to receiving the configuration message (e.g., the carrier config), the relocated FWA device 108' would detach from the coverage RF band layer of RAN 104 (and consequently disconnect any active PDU sessions). The relocated FWA device 108' may then initiate a search for another available RF band layer that it still supports (e.g., per its updated registry). If the relocated FWA device 108' is successful in finding a different, higher bandwidth, RF band layer (e.g., such as a capacity layer) from the RAN 104, it may re-attach to RAN 104 through that RF band layer. In some embodiments, after a predetermined duration of time or other reset criteria, the network configuration server 122 may re-enable support for using that coverage RF band layer. For example, the FWA device 108 may return to its authorized deployment location 150 and RAN 103, in which case, support for using a coverage RF band layer may be re-enabled to provide a fallback network connection should the capacity RF band layer of RAN 103 become unavailable. As another example, the FWA device 108 may remain at a rogue deployment location 150, but network usage conditions change such that it is no longer causing a service quality degradation. In that case, after a predetermined time duration, the ability of the FWA device 108 to use the coverage RF band of RAN 104 may be reinstated so long as RF band usage indicators remain within the predetermine quality threshold and/or within an established tolerance from established historical baselines.

Figure 2:
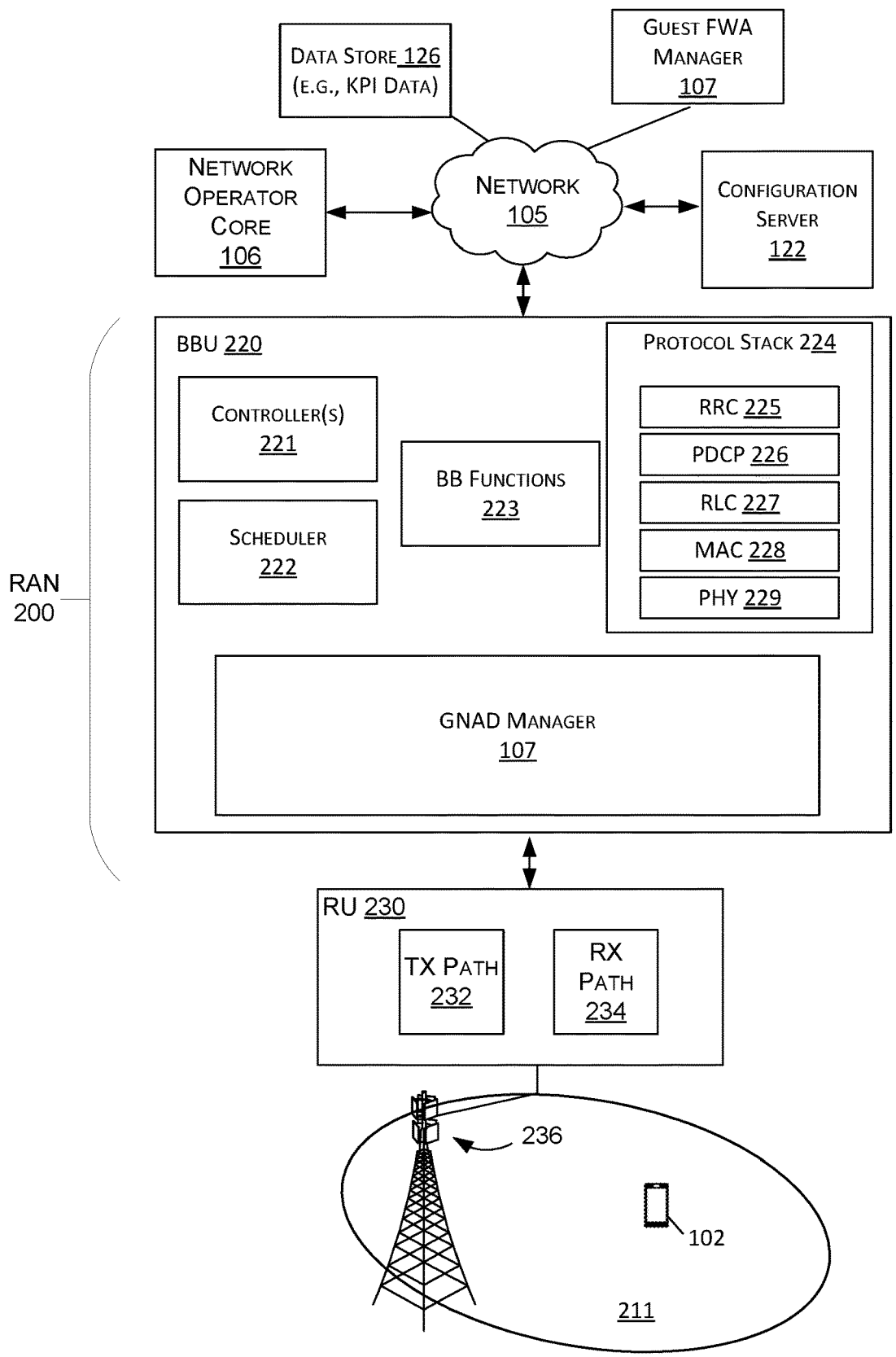
FIG. 2 is a diagram illustrating an example base station implementation of relocated network access device management, in accordance with some embodiments.

Referring now to FIG. 2, FIG. 2 illustrates an example implementation of a RAN 200, such as RAN 103 and/or RAN 104 or other wireless network base station, that may comprise a GNAD manager 107 such as discussed with respect to FIG. 1. The RAN 200 may comprise a baseband unit (BBU) 220 coupled to a least one Remote Radio Unit (RRU) 230 through which the RAN 200 serves one or more UE 102 within a coverage area 211. In some embodiments, the BBU 220 may comprise the Central Unit (CU) of an open-RAN (ORAN) architecture base station. The BBU 220 may comprise the circuitry and functionality to implement an air interface and Open System Interconnection (OSI) Layer 1, Layer 2 and Layer 3 functions for the air interface. The RRU 230 includes a radio head comprising transmit (TX) path 232 that includes radio transmitter circuitry (such digital-to-analog converters, one or more RF filters, frequency up-converters, and/or a Power Amplifier (PA)) and receive path (RX) 234 that includes radio receiver circuitry (such analog-to-digital converters, one or more RF filters, frequency down converters, and/or a Low Noise Amplifier (LNA).) The TX path 232 and RX path 234 may be coupled to one or more antennas 236 by an appropriate coupler (such as a duplexer, for example). In some embodiments, the functions of the BBU 220 and RRU 230 may be distinct components within the RAN 200, or at least partially integrated as a single component. Within the context of 5G NR, the GNAD manager 107 may be implemented using a RAN 200 that comprises either a stand-alone (SA) deployment base station, or a non-stand-alone (NSA) deployment base station.

The antennas 236 may be physically mounted to the structure such as a wall of a building or a tower. Downlink RF signals are radiated into coverage area 211 via TX path 232 and antenna(s) 236 for reception by the UE(s) 102. Uplink RF signals transmitted by the UE(s) 102 are received via the antenna(s) 236 and RX path 234. The RAN 200 may communicate with the UE(s) 102 using an air interface that supports Single Input Single Output (SISO), or Multiple Input Multiple Output (MIMO), Single Input Multiple Output (SIMO), Multiple Input Single Output (MISO) or other beam forming technologies. In some embodiments, the RAN 200 may optionally support multiple air interfaces and/or multiple wireless operators. In some embodiments, RAN 200 includes support for a plurality of RF band layers, such as at least one designated capacity RF band layer and at least one designated coverage RF band layer. A capacity RF band layer may be implemented using, for example, 4G or 5G mid-band RF band, such as but not limited to bands B41 and/or N41. A coverage RF band layer may be implemented using, for example, a 4G or 5G low-band RF band, such as but not limited to bands B71 and/or N71. In general, the designated capacity RF band layer may provide UE 102 with access to higher bandwidth channels with greater data throughput (e.g., a 190-200 MHz channel) as compared to the coverage RF band layer (e.g., a 1-15 MHz channel). That said, low-band frequencies used for a coverage RF band layer may provide a greater coverage area than mid-band frequencies of a capacity RF band layer, with less attenuation over a greater propagation distance and better penetration into buildings or other structures. In some embodiments, the network operator may define which of the RF bands supported by the RAN 102 is/are designated as a capacity RF band layer, and which is/are designated as a coverage RF band layer.

As depicted in FIG. 2, the BBU 220 may comprise one or more controllers 221 comprising a processor coupled to a memory and programed to perform one or more of the functions of a base station and/or RAN as described herein. The GNAD manager 107 is an example of function on the RAN 200 that may be executed by the one or more controllers 221. In some embodiments, one or more of the base station functions described herein may be executed by one or more controllers in a distributed manner utilizing one or more network functions orchestrated or otherwise configured to execute utilizing processors and memory of the one or more controllers. For example, where RAN 200 comprises a gNodeB, the functions of the BBU 220 may be distributed between functional units comprising a Centralized Unit (CU) and at least one Distributed Unit (DU). As such, one or more functions of the base station described herein may be implemented by discrete physical devices or via virtual network functions. It should also be noted that in some embodiments, elements of the GNAD manager 107 may be implemented at least in part on a node or network server of a communications network (such as server 124 for example) instead of, or in addition to, on-board the RAN 200. In some embodiments, the RAN 200 may be implemented on a vehicle designed for space travel (e.g., an Earth orbiting satellite) for providing a space-based wireless communications base station.

The BBU 220 is responsible for, among other things, digital baseband signal processing, for example to process uplink and downlink baseband signals, shown in FIG. 2 as Baseband (BB) function(s) 223. The BBU 220 further includes a scheduler 222 through which the BBU 220 allocates resource blocks (RBs) to the UE 102 with respect to both uplink (UL) and downlink (DL) frames. A RB is the smallest unit of resource in a communication frame that can be allocated to a UE. In some embodiments, one RB is 1 slot long in time, and in frequency comprises a plurality of subcarriers each having a frequency width determined by the applicable air interface standard. For example, for LTE, one resource block is 180 kHz wide in frequency, typically comprising twelve 15 kHz subcarriers. The data carrier within each RB is referred to as the resource element (RE), which comprises 1 subcarrier×1 symbol, and transports a single complex value representing data for a channel. Functions performed by the scheduler 222 include, but are not limited to: Packet Scheduling (arbitration of access to air interface resources between active UE), resource allocation (allocation of air interface resources, such as resource blocks, to UE), and power allocations (adjusting transmit power to achieve desired data rates and signal-to-interference noise ratio (SINR) levels).

Uplink (UL) and downlink (DL) communications traffic between the BBU 220 and UE 102 are processed through a protocol stack 224 implemented by the BBU 220 that comprises various protocol stack layers. In the example embodiment illustrated in FIG. 2, the protocol stack 224 includes a radio resource control (RRC) layer 225, packet data convergence protocol (PDCP) layer 226, radio link control (RLC) layer 227, medium access control (MAC) layer 228, and physical layer (PHY) 229. The MAC layer 228 is responsible, for example, for mapping between logical channels of the RLC layer 227 and transport channels of the PHY layer 229. MAC layer 228 may also perform functions such as, but not limited to, multiplexing of MAC service data units (SDUs) from logical channels onto transport blocks (TB) to be delivered to the PHY layer 229 on transport channels, de-multiplexing of MAC SDUs from one or different logical channels from transport blocks (TB) delivered from the PHY layer 229 on transport channels, scheduling information reporting, error correction through hybrid automatic repeat requests (HARQ), priority handling between UEs by means of dynamic scheduling, priority handling between logical channels of one UE, and logical channel prioritization.

As already mentioned above, in some embodiments the BBU 220 implements the GNAD manager 107. For example, the GNAD manager 107 may be at least in part executed by the controller(s) 221 of the BBU 220. The GNAD manager 107 may operate in conjunction with other operations executed by the BBU 220 to implement services that address the problem of potential network service degradations caused by unauthorized relocation of FWA devices.

As shown in FIG. 2, the GNAD manager 107 may obtain from the network server 124 network band usage data 126 that includes one or more of the RF band usage indicators which may be monitored and/or used to determine when a relocated FWA device 108' attached to the RAN 102 is causing a potential service quality degradation on the coverage RF band layer of the RAN 102. In some embodiments, the GNAD manager 107 may periodically query the network server 124 to obtain updates to the RF band usage indicators. In some embodiments, the network server 124 may periodically push updates to the RF band usage indicators to the GNAD manager 107. In some embodiments, the GNAD manager 107 may obtain one or more RF band usage indicators from measurement reports from UE 102 attached to the RAN 200. For example, a measurement report from a UE 102 may include measurements of signals corresponding to different radio access technology layers and/or different RF band layers, measurements of Reference Signal Received Power (RSRP), Reference Signal Received Quality (RSRQ), Received Signal Strength Indicator (RSSI), Synchronization Signal reference signal received power (SS-RSRP) and/or other measurements.

Figure 4:
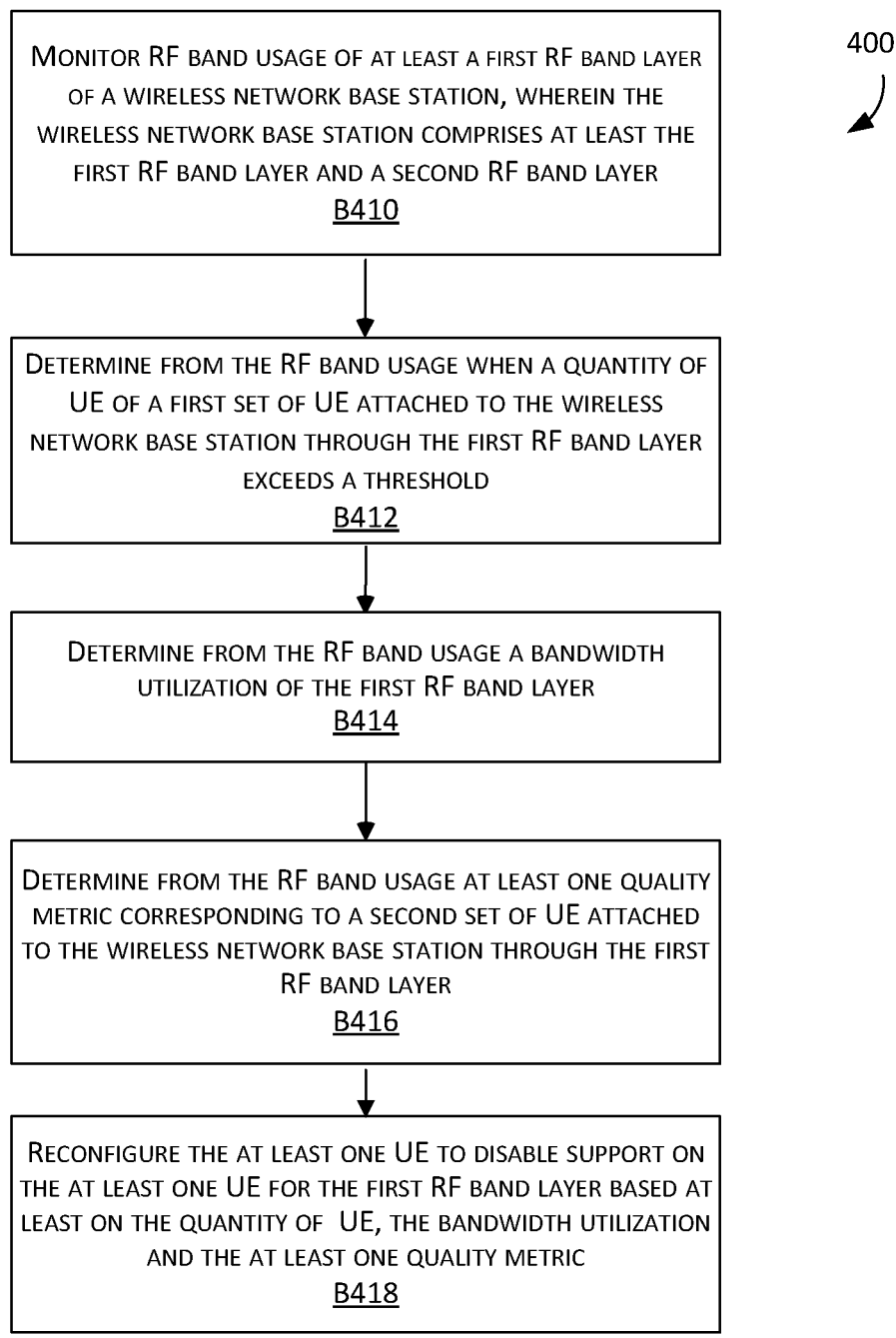
FIG. 4 is flow chart illustrating a method for relocated network access device management, in accordance with some embodiments.
Figure 5:
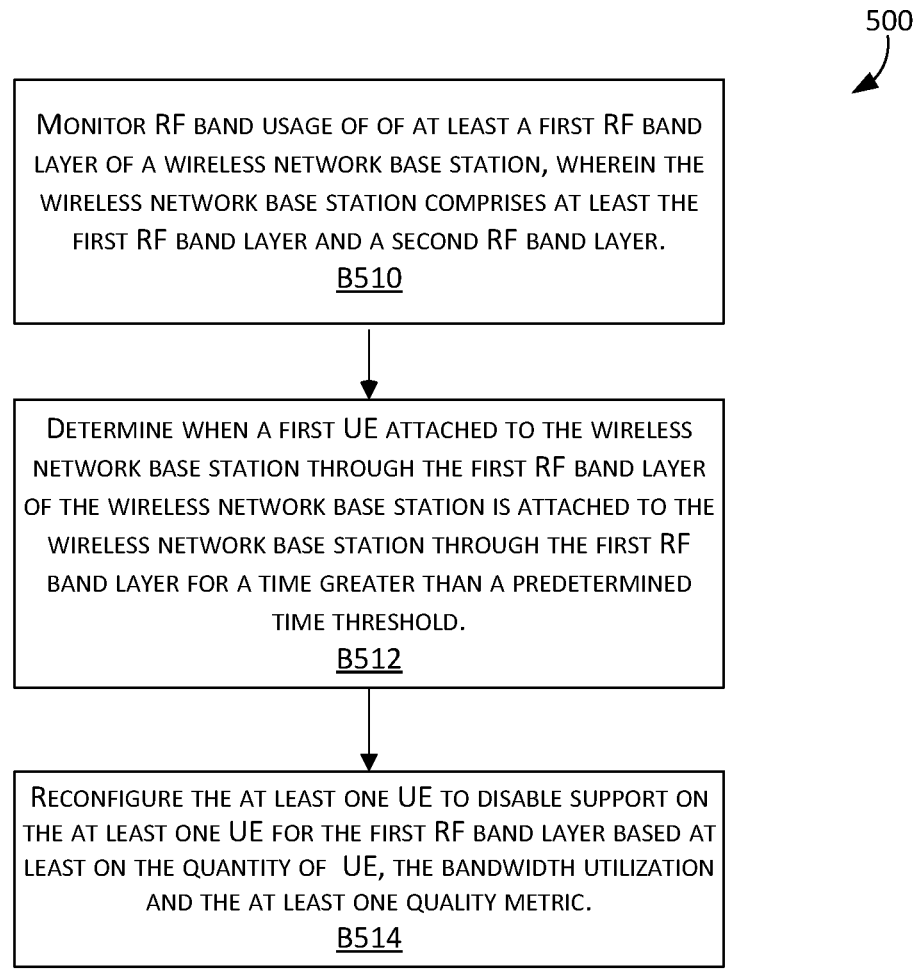
FIG. 5 is flow chart illustrating another method for relocated network access device management, in accordance with some embodiments.

To trigger a detachment of a relocated FWA 108' from the coverage RF band layer of the RAN 200, the GNAD manager 107 may communicate with the configuration server 122 to initiate disabling of the coverage RF band layer on the relocated FWA device 108'. For example, the GNAD manager 107 may send a request to the configuration server 122 to initiate a configuration message to the relocated FWA device 108' (and/or other FWA devices on the coverage layer of the RAN 200) to disable the FWA devices' ability to use the RF band corresponding to the coverage RF band layer of RAN 200. An example of processes for managing relocated FWA, in accordance with embodiments described herein, are illustrated as shown in FIGS. 3, 4 and 5 below.

Figure 3:
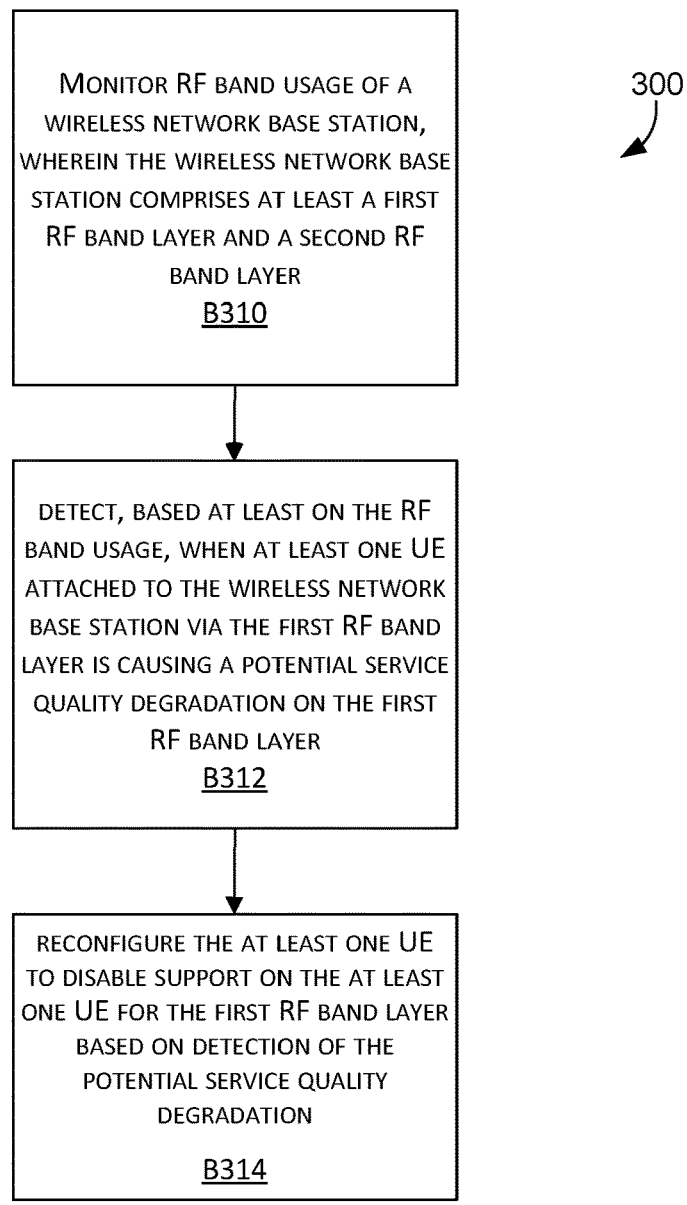
FIG. 3 is flow chart illustrating a method for relocated network access device management, in accordance with some embodiments.

FIG. 3 is a flow chart illustrating an example method 300 for managing wireless communication base station band usage by network access devices, according to an embodiment. As discussed herein, method 300 may more specifically be used for managing relocated FWA devices that have been moved from their authorized deployment location. It should be understood that the features and elements described herein with respect to the method of FIG. 3 may be used in conjunction with, in combination with, or substituted for elements of, any of the other embodiments discussed herein and vice versa. Further, it should be understood that the functions, structures, and other descriptions of elements for embodiments described in FIG. 3 may apply to like or similarly named or described elements across any of the figures and/or embodiments described herein and vice versa. In some embodiments, elements of method 300 may be implemented utilizing a GNAD manager executed on a RAN, network server, and/or on an FWA device, as discussed herein.

Method 300 at block B310 includes monitoring RF band usage of at least a first RF band layer of a wireless network base station, wherein the wireless network base station comprises at least the first RF band layer and a second RF band layer. Monitoring RF band usage of a wireless network base station may include monitoring one or more RF band usage indicators generated by one or more elements and/or network functions of the communications network. For example, RF band usage indicators may include, or may be derived from, call data records (CDRs), event data records (EDRs), and/or location service records (LSR), for example. Non-limiting examples of information obtained by monitoring RF band usage may include RF band usage information such as, but not limited to, call trace data, per call measurement data (PCMD), active session statistics, RF signal measurement reports and/or voice quality metrics, video stream freeze rates, video stream start rates, voice loss rates, video loss rates, dropped call rates, bandwidth utilization of the RF band layers available via RAN 104, UE data throughput, data rates, signal to noise ratio (SNR) measurements, signal to interference and noise ratio (SINR) measurements, latency statistics and/or other quality of service statistics. RF band usage indicators may also indicate base station attachment time, such as an amount of time that a UE 102 (including FWA devices such as FWA device 108) has been attached to a given RAN and/or to a given RF band layer. In some embodiments, the RF band usage indicators may be aggregated over a predefined aggregation window of time. In some embodiments, monitoring RF band usage of at least a first RF band layer may be performed at least in part by an FWA device, such as FWA device 108. For example, one or more functions of an FWA device may generate RF band usage indicators such as an attachment time, that indicate a time that the FWA device has been attached to a given RAN and/or to a given RF band layer (e.g., such as a time indicating how long the FWA devices has been attached to a coverage RF band layer of a base station). Additionally, or instead, one or more functions of an FWA device may generate the RF band usage indicators such as UE data throughput, data rates, SNR measurements, SINR measurements, latency statistics and/or other quality of service statistics regarding RF band usage with respect to the FWA device's connection with a RAN and/or RF band layer.

Method 300 at block B312 includes detecting, based at least on the RF band usage, when at least one UE attached to the wireless network base station via the first RF band layer is causing a potential service quality degradation on the first RF band layer. As described herein the at least one UE may comprise an access device, such as an FWA, that functions as an access device to share or distributes a network connection to connectivity services (e.g., such as voice and/or data services) available through the base station with one or more UE that are in communication with the FWA device. Challenges with FWA devices may arise when an FWA device is removed by a consumer from its authorized deployment location, and relocated to a rogue deployment location. As a result of the capacity of a coverage RF band layer being consumed by a relocated FWA device operating at a rogue location, other UE operating on the coverage RF band layer may experience degradations in service such as, but not limited to, increases in latency, dropped calls, decreased data speeds, and/or other quality of service degradations. Moreover, unauthorized movement of FWA devices negatively affects the accuracy of network capacity studies used for network planning. The method may determine that a UE, such as a relocated FWA device, is causing a potential service quality degradation for other UE, for example, based on RF band usage indicators crossing a predetermine quality threshold and/or deviating from established historical baselines. For example, a GNAD manager may compare one or more RF band usage indicators to baselines for those indicators derived for historical non-FWA device UE using the coverage RF band layer to determine an effect of a relocated FWA device attaching to the coverage RF band layer. In some embodiments, a GNAD manager may implement logic to determine when a relocated FWA device is potentially causing service quality degradation on the coverage RF band layer using a network monitoring approach such as further described with respect to FIG. 4. In some embodiments, a GNAD manager may implement logic to determine when a relocated FWA device is potentially causing service quality degradation on the coverage RF band layer using an FWA device monitoring approach such as further described with respect to FIG. 5.

Method 300 at block B314 includes reconfiguring the at least one UE to disable support on the at least one UE for the first RF band layer based on detection of the potential service quality degradation. In some embodiments, reconfiguration of a relocated FWA device to disable the ability of the relocated FWA device to attach to the coverage RF band layer of a RAN may comprise removing a code or identifier of the coverage RF band layer from a listing within the FWA device of RF band layers that the FWA device supports and/or otherwise indicating on a registry within the FWA device that the coverage RF band layer is not an RF band layer that the FWA is authorized to use. In some embodiments, reconfiguring the at least one UE to disable support on the at least one UE for the first RF band layer may include initiating, based at least on the potential service quality degradation, may include transmission of a configuration message to the at least one UE. The configuration message may disable a functionality on the at least one UE for attaching to the wireless network base station using the first RF band layer based at least on the potential service quality degradation.

For example, in some embodiments, a reconfiguration of the relocated FWA device 108' may be trigger through a network configuration server, such as network configuration server 122. In some embodiments, the GNAD manager 107 may trigger a reconfiguration of the relocated FWA device 108' by causing the network configuration server 122 to send a configuration message to the relocated FWA device 108' and/or other FWA devices operating on the coverage RF band layer of the RAN 104, to disable support of that coverage RF band layer.

In response, the relocated FWA device 108' would detach from the coverage RF band layer of RAN 104 (and consequently disconnect any active PDU sessions). The relocated FWA device 108' may then initiate a search for another available RF band layer that it still supports after application of the configuration message from the network configuration server 122 triggered by the GNAD manager 107. If the relocated FWA device 108' is successful in finding a different, higher bandwidth, RF band layer (e.g., such as a capacity layer) from the RAN 104, it may re-attach to RAN

104 through that RF band layer. In some embodiments, after a predetermined duration of time or other reset criteria, the network configuration server 122 may re-enable support for using that coverage RF band layer.

FIG. 4 is a flow chart illustrating a method 400 for managing wireless communication base station band usage by network access devices, according to an embodiment. As discussed herein, method 400 may more specifically be used for managing relocated FWA devices that have been moved from their authorized deployment location. It should be understood that the features and elements described herein with respect to the method of FIG. 4 may be used in conjunction with, in combination with, or substituted for elements of, any of the other embodiments discussed herein and vice versa. Further, it should be understood that the functions, structures, and other descriptions of elements for embodiments described in FIG. 4 may apply to like or similarly named or described elements across any of the figures and/or embodiments described herein and vice versa. In some embodiments, elements of method 400 may be implemented utilizing a GNAD manager executed on a RAN, network server, and/or on an FWA device, as discussed herein, and may correspond to the network monitoring approach for managing relocated FWA devices as discussed elsewhere herein. With the network monitoring approach, the band usage of a coverage RF band layer for a base station may be monitored to determine if the coverage RF band layer has attached to it more than a threshold quantity of UE that belong to a first set of UE made up of FWA devices (e.g., such as FWA device 108). For example, a GNAD manager may determine when an N71 band coverage layer has more than a threshold quantity of ten attached FWA devices. Note that any authorized FWA devices operating on that base station (e.g., FWA devices operating at their respective authorized deployment location) are likely operating on that base station's capacity layer rather than the coverage layer. If the coverage RF band layer has attached a greater number of FWA devices than the threshold quantity, then cell utilization may be evaluated and a determination made as to whether bandwidth utilization of the coverage RF band layer exceeds a utilization threshold. For example, the GNAD manager may determine when the N71 band coverage layer has a bandwidth utilization of more than a threshold utilization (e.g., a 70% utilization). If there are a number of FWA devices on the coverage RF band layer, but there ample bandwidth margin available on the coverage RF band layer, then the presence of relocated FWA devices operating on the coverage RF band layer may not represent a burden to the base station that is considered a potential service quality degradation. However, when bandwidth utilization of the coverage RF band layer exceeds a utilization threshold, that is an indication that there are regular UE (e.g., non-FWA device) relying on that coverage RF band layer for connectivity to the communications network. Implementing the network monitoring approach may therefore include determining at least one quality metric for a second set of UE attached through the coverage RF band layer (e.g., a set of non-FWA devices). If UE in that second set are having an inferior experience on the coverage RF layer (e.g., where RF signal quality is above established acceptable levels but data throughput is below established acceptable levels) then the relocated FWA devices may be deemed as causing a potential service quality degradation on the coverage RF band layer, and steps taken to trigger removal of the relocated FWA devices from the coverage RF band layer.

Referring now to FIG. 4, Method 400 at block B410 includes monitoring RF band usage of at least a first RF band layer of a wireless network base station, wherein the wireless network base station comprises at least the first RF band layer and a second RF band layer. Monitoring RF band usage of a wireless network base station may include monitoring one or more RF band usage indicators generated by one or more elements and/or network functions of the communications network as described above with respect to FIG. 3 and elsewhere herein. In some embodiments, RF band usage indicators may be obtained from network band usage data 126 available from a network server 124. In method 400, detecting when at least one UE attached to the wireless network base station via the first RF band layer is causing a potential service quality degradation on the first RF band layer may be implemented as shown in one or more of blocks B412, B414 and B416.

Method 400 at block B412 includes determining from the RF band usage when a quantity of UE of a first set of UE attached to the wireless network base station through the first RF band layer exceeds a threshold. For example, the first set of UE may be defined as a set of one or more relocated FWA devices that have attached to the coverage RF band layer of the base station. The quantity of relocated FWA devices that have attached to the coverage RF band layer may be determined from monitored RF band usage indicators. Method 400 at block B414 includes determining from the RF band usage a bandwidth utilization of the first RF band layer. As discussed above, in some embodiments, bandwidth utilization statistics for the first RF band layer are performance indicators collected by the operator core network 106 and may be obtained from network band usage data 126 available from a network server 124.

Method 400 at block B416 includes determining from the RF band usage at least one quality metric corresponding to a second set of UE attached to the wireless network base station through the first RF band layer. For example, the first set of UE may comprise one or more access devices such as the FWA device 108. The second set of UE may comprise regular UE devices, such as mobile UE devices that are intended primary users of a coverage RF band layer. The quality metric thus may be a measurement representing the quality of service of devices affected by an unauthorized relocated FWA using the coverage RF band layer. In some embodiments, the quality metric may comprise a representation of user experience quality, such as a ratio of data rate or throughput to SNR or SINR, or other measurement that is representative of the bandwidth utilization throughput for UE of the second set of UE. Other quality metrics may include, but are not limited to key performance indicators (KPI) such as video freeze rate, video start rate, latency measurements, and/or other RF band usage indicators as discussed herein. In some embodiments, the quality metric may be derived from an aggregations of RF band usage indicators over a predefined aggregation window of time. Determining the quality metric may thus indicate when an access device is causing a potential service quality degradation for other UE, for example, based on the quality metric crossing a predetermine quality threshold and/or deviating from established historical baselines.

Method 400 at block B418 includes reconfiguring the at least one UE to disable support on the at least one UE for the first RF band layer based at least on the quantity of UE, the bandwidth utilization and the at least one quality metric. As discussed above with respect to FIG. 3, reconfiguration of a relocated FWA device to disable the ability of the relocated FWA device to attach to the coverage RF band layer of a RAN may comprise removing a code or identifier of the coverage RF band layer from a listing within the FWA device of RF band layers that the FWA device supports and/or otherwise indicating on a registry within the FWA device that the coverage RF band layer is not an RF band layer that the FWA is authorized to use. In some embodiments, reconfiguring the at least one UE to disable support on the at least one UE for the first RF band layer may include initiating, based at least on the potential service quality degradation, transmission of a configuration message to the at least one UE. The configuration message may disable a functionality on the at least one UE for attaching to the wireless network base station using the first RF band layer based at least on the potential service quality degradation. In some embodiments, a configuration message (e.g., a carrier confirm) may be pushed by a configuration server 122 to a set of FWA devices that are attached to the coverage RF band layer to attempt to detach relocated FWA devices from the coverage RF band layer. Those relocated FWA device 108 may then initiate a search for another available RF band layer that it still supports after application of the reconfiguration triggered by the GNAD manager. If a relocated FWA device is successful in finding another RF band layer (e.g., such as a capacity layer) that it is enable to attached to from the base station, it may re-attach to that base station through that RF band layer. In some embodiments, after a predetermined duration of time or other reset criteria, the network configuration server 122 may push another configuration message to re-enable support in those FWA devices for using the coverage RF band layer.

FIG. 5 is a flow chart illustrating a method 500 for managing wireless communication base station band usage by network access devices, according to an embodiment. As discussed herein, method 500 may more specifically be used for managing relocated FWA devices that have been moved from their authorized deployment location. It should be understood that the features and elements described herein with respect to the method of FIG. 5 may be used in conjunction with, in combination with, or substituted for elements of, any of the other embodiments discussed herein and vice versa. Further, it should be understood that the functions, structures, and other descriptions of elements for embodiments described in FIG. 5 may apply to like or similarly named or described elements across any of the figures and/or embodiments described herein and vice versa. In some embodiments, elements of method 500 may be implemented utilizing a GNAD manager executed on a RAN, network server, and/or on an FWA device, as discussed herein, and may correspond to the device monitoring approach for managing relocated FWA devices as discussed elsewhere herein.

Method 500 at block B510 includes monitoring RF band usage of at least a first RF band layer of a wireless network base station, wherein the wireless network base station comprises at least the first RF band layer and a second RF band layer. Monitoring RF band usage of a wireless network base station may include monitoring one or more RF band usage indicators generated by one or more elements and/or network functions of the communications network as described above with respect to FIG. 3 and elsewhere herein. In some embodiments, RF band usage indicators may be obtained from network band usage data 126 available from a network server 124. In method 400, detecting when at least one UE attached to the wireless network base station via the first RF band layer is causing a potential service quality degradation on the first RF band layer may be implemented as shown in block B512.

Method 500 at block B512 includes determining when a first UE attached to the wireless network base station through the first RF band layer of the wireless network base station is attached to the wireless network base station through the first RF band layer for a time greater than a predetermined time threshold. The predetermined time threshold may be based on time statistic. For example, the predetermined time threshold may be based on a time duration, such as whether the first UE is attach to the first RF band layer for greater than a specified time (e.g., 12 hours, 24 hours). The predetermined time threshold may be based on a time based percentage time, such as whether the first UE is attach to the first RF band layer for greater than a specified percentage of time (e.g., more than 95%) within a duration window (e.g., the past 12 hours, 24 hours). Additionally, or instead, one or more functions of an FWA device may generate the RF band usage indicators used at B512 such as UE data throughput, data rates, SNR measurements, SINR measurements, latency statistics and/or other quality of service statistics regarding RF band usage with respect to the FWA device's connection with a RAN and/or RF band layer.

Method 500 at block B514 includes reconfiguring the at least one UE to disable support on the at least one UE for the first RF band layer based at least on the quantity of UE, the bandwidth utilization and the at least one quality metric. As discussed above with respect to FIG. 3, reconfiguration of a relocated FWA device to disable the ability of the relocated FWA device to attach to the coverage RF band layer of a RAN may comprise removing a code or identifier of the coverage RF band layer from a listing within the FWA device of RF band layers that the FWA device supports and/or otherwise indicating on a registry within the FWA device that the coverage RF band layer is not an RF band layer that the FWA is authorized to use. In some embodiments, reconfiguring the at least one UE to disable support on the at least one UE for the first RF band layer may include initiating, based at least on the potential service quality degradation, transmission of a configuration message to the at least one UE. The configuration message may disable a functionality on the at least one UE for attaching to the wireless network base station using the first RF band layer based at least on the potential service quality degradation. In some embodiments, a configuration message (e.g., a carrier confirm) may be pushed by a configuration server 122 to a set of FWA devices that are attached to the coverage RF band layer to attempt to detach relocated FWA devices from the coverage RF band layer. Those relocated FWA device 108 may then initiate a search for another available RF band layer that it still supports after application of the reconfiguration triggered by the GNAD manager. If a relocated FWA device is successful in finding another RF band layer (e.g., such as a capacity layer) that it is enable to attached to from the base station, it may re-attach to that base station through that RF band layer. In some embodiments, after a predetermined duration of time or other reset criteria, the network configuration server 122 may push another configuration message to re-enable support in those FWA devices for using the coverage RF band layer.

Figure 6:
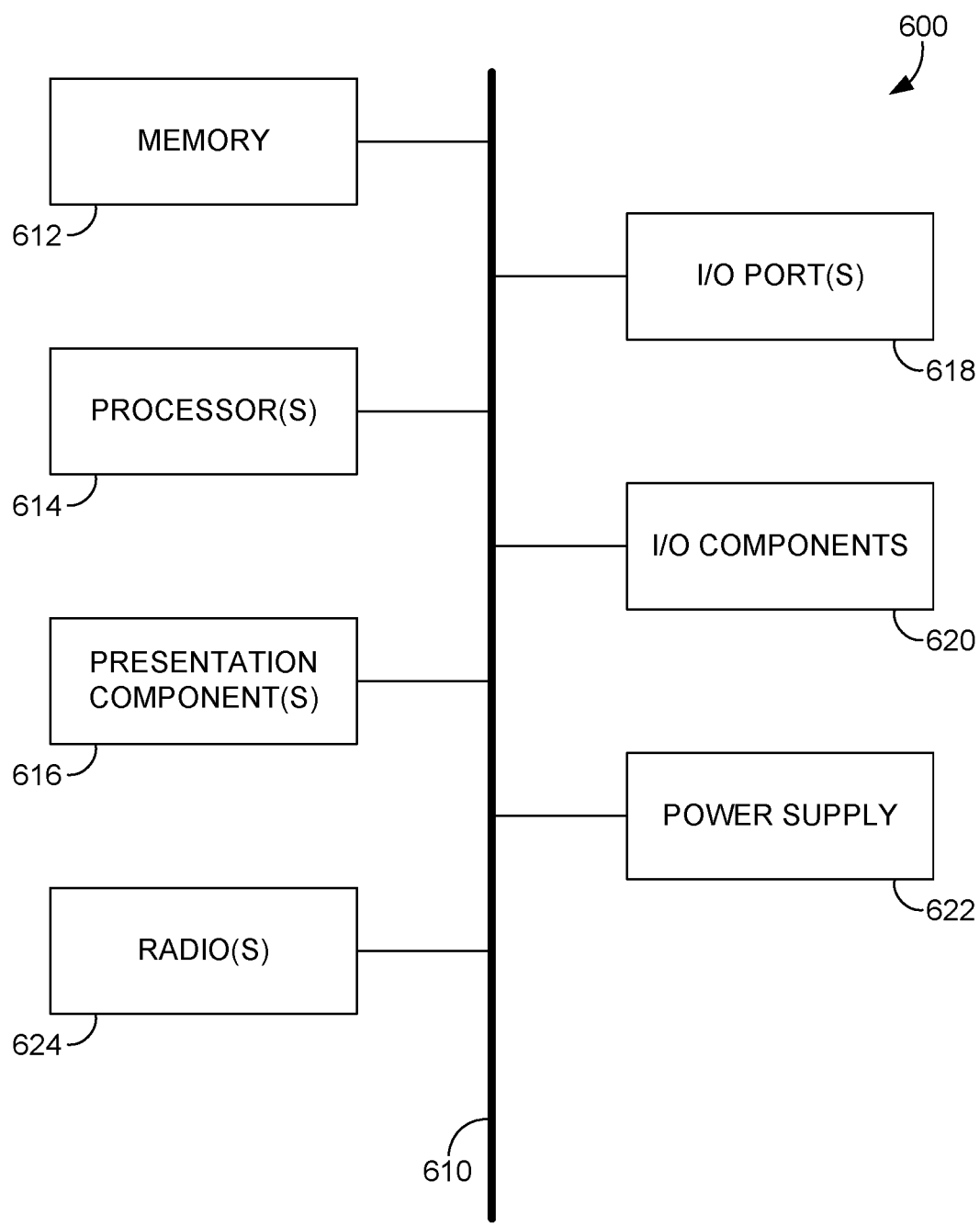
FIG. 6 is diagram illustrating an example computing environment, in accordance with some embodiments.

Referring to FIG. 6, a diagram is depicted of an exemplary computing environment suitable for use in implementations of the present disclosure. In particular, the exemplary computer environment is shown and designated generally as computing device 600. Computing device 600 is but one example of a suitable computing environment and is not intended to suggest any limitation as to the scope of use or functionality of the embodiments described herein. Neither should computing device 600 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 6, computing device 600 includes bus 610 that directly or indirectly couples one or more of the following devices: memory 612, one or more processors 614, one or more presentation components 616, input/output (I/O) ports 618, I/O components 620, power supply 622, and radio 624. Bus 610 represents what may be one or more busses (such as an address bus, data bus, or combination thereof). The components of FIG. 6 are shown with lines for the sake of clarity. However, it should be understood that the functions performed by one or more components of the computing device 600 may be combined or distributed amongst the various components. For example, a presentation component such as a display device may be one of I/O components 620. In some embodiments, a base station, RAN and/or network server node, implementing one or more aspects of a GNAD manager may comprise a computing device 600. In some embodiments, a UE, such as UE 102 and/or FWA device 108, may comprise a computing device such as computing device 600.

The processors of computing device 600, such as one or more processors 614, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device." In some embodiments, one or more aspects of a GNAD manager 107 may be implemented at least in part by code executed by the one or more processors(s) 614 using memory 612. In some embodiments, a network band usage data 126 may be stored in a memory 612 of the computing device 600.

Computing device 600 typically includes a variety of computer-readable media. Computer-readable media can be any available non-transient media that can be accessed by computing device 600 and includes both volatile and non-volatile media, removable and non-removable media. By way of example, and not limitation, computer-readable media may comprise computer storage media and communication media. Computer storage media includes both volatile and nonvolatile, removable and non-removable non-transient media implemented in any method or technology for storage of information such as computer-readable instructions, data structures, program modules or other data. Computer storage media includes non-transient RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes tangible, non-transient, computer-storage media in the form of volatile and/or nonvolatile memory. Memory 612 may be removable, non-removable, or a combination thereof. Exemplary memory includes solid-state memory, hard drives, optical-disc drives, etc. Computing device 600 includes one or more processors 614 that read data from various entities such as bus 610, memory 612 or I/O components 620. One or more presentation components 616 may present data indications to a person or other device. Exemplary one or more presentation components 616 include a display device, speaker, printing component, vibrating component, etc. I/O ports 618 allow computing device 600 to be logically coupled to other devices including I/O components 620, some of which may be built in computing device 600. Illustrative I/O components 620 include a microphone, joystick, game pad, satellite dish, scanner, printer, wireless device, etc.

Radio(s) 624 represents a radio that facilitates communication with a wireless telecommunications network. For example, radio(s) 624 may be used to establish communications with a UE and/or a RAN. Illustrative wireless telecommunications technologies include CDMA, GPRS, TDMA, GSM, 4G LTE, 3GPP 5G, and other 3GPP technologies. In some embodiments, the radio(s) 624 comprise circuits that implement a radio module of a UE 102, a FWA device 108, a RAN 103, and/or an RAN 104, as described herein. Radio(s) 624 may additionally or alternatively facilitate other types of non-3GPP wireless communications including Wi-Fi, WiMAX, and/or other VoIP communications. In some embodiments, radio(s) 624 may support multi-modal connections that include a combination of 3GPP radio technologies (e.g., 4G, 5G and/or 6G) and/or non-3GPP radio technologies. As can be appreciated, in various embodiments, radio(s) 624 can be configured to support multiple technologies and/or multiple radios can be utilized to support multiple technologies. In some embodiments, the radio(s) 624 may support communicating with an access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Figure 7:
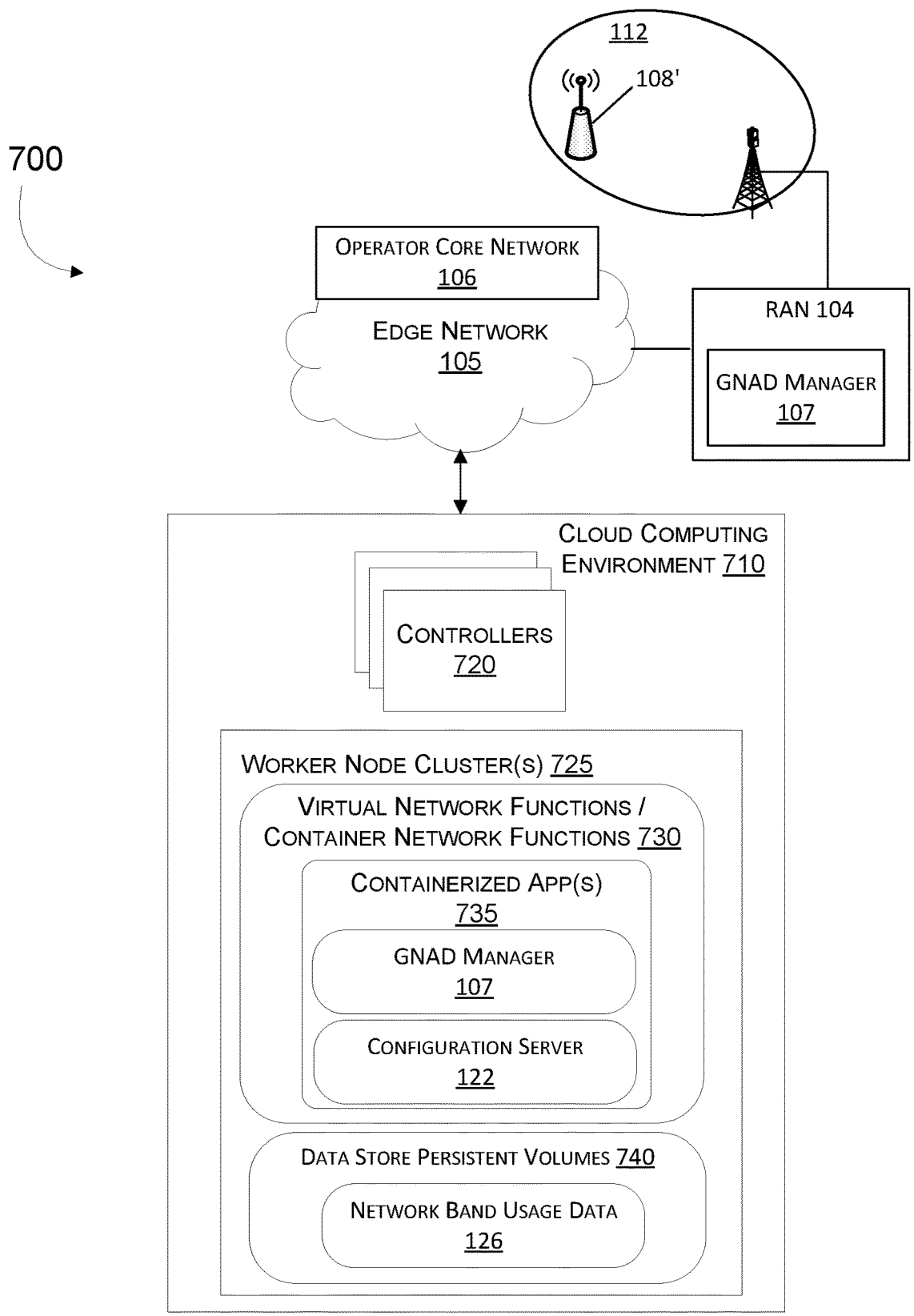
FIG. 7 is diagram illustrating an example cloud computing environment, in accordance with some embodiments.

Referring to FIG. 7, a diagram is depicted generally at 700 of an exemplary cloud computing environment 710 for implementing one or more aspects of a GNAD manager, such as described herein. Cloud computing environment 710 is but one example of a suitable cloud-computing environment and is not intended to suggest any limitation as to the scope of use or functionality of the embodiments presented herein. Neither should cloud-computing environment 710 be interpreted as having any dependency or requirement relating to any one or combination of components illustrated. In some embodiments, the cloud-computing environment 710 is executed within an operator core network 106, a node of core network edge 105, or otherwise coupled to the core network edge(s) or operator core network(s).

Cloud computing environment 710 includes one or more controllers 720 comprising one or more processors and memory. The cloud computing environment 710 may include one or more data store persistent volumes 740. The controllers 720 may comprise servers of one or more data centers. In some embodiments, the controllers 720 are programmed to execute code to implement at least one or more aspects of a GNAD manager 107. For example, in one embodiment the GNAD manager 107 may be implemented, at least in part, as one or more virtual network functions (VNFs)/container network functions (CNFs) 730 running on a worker node cluster 725 established by the controllers 720. In some embodiments network band usage data 126 used by the GNAD manager 107 may be stored using the one or more data store persistent volumes 740. The cluster of worker nodes 725 may include one or more orchestrated Kubernetes (K8s) pods that realize one or more containerized applications 735 for the terrestrial coverage heat map generator 107. In other embodiments, another orchestration system may be used to realize the terrestrial coverage heat map generator 107. For example the worker nodes 725 may use lightweight Kubernetes (K3s) pods, Docker Swarm instances, and/or other orchestration tools. In some embodiments, one or more elements of the RAN 103 and/or RAN 104, and/or other elements of the network environment 100, may be coupled to the controllers 720 of the cloud-computing environment 710. In some embodiments, the controllers 720 may programmed to execute code to implement one or more aspects of a configuration server 122 discussed herein.

In various alternative embodiments, system and/or device elements, method steps, or example implementations described throughout this disclosure (such as the UE, core network edge, operator core network, RAN, base stations, access nodes, access devices, GNAD manager, and/or any of the sub-parts thereof, for example) may be implemented at least in part using one or more computer systems, field programmable gate arrays (FPGAs), application specific integrated circuits (ASICs) or similar devices comprising a processor coupled to a memory and executing code to realize that elements, processes, or examples, said code stored on a non-transient hardware data storage device. Therefore, other embodiments of the present disclosure may include elements comprising program instructions resident on computer readable media which when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system of device having a physical, tangible form. Program instructions include, but are not limited to, computer executable instructions executed by computer system processors and hardware description languages such as Verilog or Very High Speed Integrated Circuit (VHSIC) Hardware Description Language (VHDL).

As used herein, the terms "function", "unit", "server", "node" and "module" are used to describe computer processing components and/or one or more computer executable services being executed on one or more computer processing components. In the context of this disclosure, such terms used in this manner would be understood by one skilled in the art to refer to specific network elements and not used as nonce word or intended to invoke 35 U.S.C. 112 (f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for managing wireless communication base station radio frequency (RF) band usage by access devices, the system comprising:
   one or more processors; and
   one or more computer-readable media storing computer-usable instructions that, when executed by the one or more processors, cause the one or more processors to:
   monitor RF band usage of at least a first RF band layer of a wireless network base station, wherein the wireless network base station comprises at least the first RF band layer and a second RF band layer;
   detect, based at least on the RF band usage, when at least one user equipment (UE) attached to the wireless network base station via the first RF band layer is causing a potential service quality degradation on the first RF band layer; and
   reconfigure the at least one UE to disable support on the at least one UE for the first RF band layer based on detection of the potential service quality degradation.

2. The system of claim 1, wherein the at least one UE comprise an access device that distributes a network connection available through the wireless network base station with one or more UE that are in communication with the at least one UE.

3. The system of claim 1, wherein the first RF band layer comprises a coverage RF band layer and the second RF band layer comprises a capacity RF band layer, wherein the capacity RF band layer comprises a greater communication channel bandwidth than the coverage RF band layer.

4. The system of claim 1, the one or more processors further to:
disable a functionality on the at least one UE for attaching to the wireless network base station using the first RF band layer based at least on the potential service quality degradation.

5. The system of claim 1, the one or more processors further to:
initiate, based at least on the potential service quality degradation, transmission of a configuration message to the at least one UE to reconfigure the at least one UE to disable support on the at least one UE for the first RF band layer.

6. The system of claim 1, the one or more processors further to:
monitor RF band usage based on one or more RF band usage indictors, the one or more RF band usage indictors based at least on one of: call data records (CDRs), event data records (EDRs), location service records (LSRs), call trace data, per call measurement data (PCMD), active session statistics, RF signal measurement reports, voice quality metrics, video stream freeze rates, video stream start rates, voice loss rates, video loss rates, dropped call rates, bandwidth utilization, UE data throughput, data rates, signal to noise ratio (SNR) measurements, signal to interference and noise ratio (SINR) measurement, latency statistics, or a base station attachment time.

7. The system of claim 1, the one or more processors further to:
detect when the at least one UE is causing the potential service quality degradation on the first RF band layer based on one or both of:
a RF band usage indicator crossing a predetermine quality threshold; or
the RF band usage indicator deviating from a historical baseline.

8. The system of claim 1, wherein the one or more processors, to detect when the at least one UE is causing the potential service quality degradation on the first RF band layer, are further to one or more of:
determine, from the RF band usage, when a quantity of UE of a first set of UE attached to the wireless network base station through the first RF band layer exceeds a threshold;
determine, from the RF band usage, a bandwidth utilization of the first RF band layer; or
determine, from the RF band usage, at least one quality metric corresponding to a second set of UE attached to the wireless network base station through the first RF band layer.

9. The system of claim 8, wherein the first set of UE comprises one or more fixed wireless access (FWA) devices that include the at least one UE; and
the second set of UE comprises one or more mobile non-FWA devices.

10. The system of claim 1, wherein the one or more processors, to detect when the at least one UE is causing the potential service quality degradation on the first RF band layer, are further to determine when the at least one UE is attached to the wireless network base station through the first RF band layer for a time greater than a predetermined time threshold.

11. A wireless network base station, the base station comprising:
at least one controller comprising one or more processing units to execute one or more wireless communication base station functions, wherein the wireless network base station is configured to communicate with one or more user equipment (UE) over one or both of uplink (UL) radio frequency (RF) signals and downlink (DL) RF signals, the one or more processing units to further execute operations comprising:
monitoring RF band usage of at least a first RF band layer of the wireless network base station, wherein the wireless network base station comprises at least the first RF band layer and a second RF band layer;
detecting, based at least on the RF band usage, when at least one UE attached to the wireless network base station via the first RF band layer is causing a potential service quality degradation on the first RF band layer; and
reconfiguring the at least one UE to disable support on the at least one UE for the first RF band layer based on detection of the potential service quality degradation.

12. The base station of claim 11, wherein the first RF band layer comprises a coverage RF band layer and the second RF band layer comprises a capacity RF band layer, wherein the capacity RF band layer comprises a greater communication channel bandwidth than the coverage RF band layer.

13. The base station of claim 11, the operations further comprising:
initiating, based at least on the potential service quality degradation, transmission of a configuration message to the at least one UE to reconfigure the at least one UE to disable support on the at least one UE for the first RF band layer.

14. The base station of claim 11, the operations further comprising one or more of:
determining, from the RF band usage, when a quantity of UE of a first set of UE attached to the wireless network base station through the first RF band layer exceeds a threshold;
determining, from the RF band usage, a bandwidth utilization of the first RF band layer; or
determining, from the RF band usage, at least one quality metric corresponding to a second set of UE attached to the wireless network base station through the first RF band layer.

15. The base station of claim 14, wherein the first set of UE comprises one or more fixed wireless access (FWA) devices that include the at least one UE; and
the second set of UE comprises one or more mobile non-FWA devices.

16. The base station of claim 11, the operations further comprising:
determining when the at least one UE is attached to the wireless network base station through the first RF band layer for a time greater than a predetermined time threshold.

17. A method for managing wireless communication base station band usage by access devices, the method comprising:
monitoring radio frequency (RF) band usage of at least a first RF band layer of a wireless network base station, wherein the wireless network base station comprises at least the first RF band layer and a second RF band layer that comprises a greater communication channel bandwidth than the first RF band layer;

detecting, based at least on the RF band usage, when at least one user equipment (UE) attached to the wireless network base station via the first RF band layer is causing a potential service quality degradation on the first RF band layer; and reconfiguring the at least one UE to disable support on the at least one UE for the first RF band layer based on detection of the potential service quality degradation.

18. The method of claim 17, the method further comprising one or more of:

determining, from the RF band usage, when a quantity of UE of a first set of UE attached to the wireless network base station through the first RF band layer exceeds a threshold;

determining, from the RF band usage, a bandwidth utilization of the first RF band layer; or determining, from the RF band usage, at least one quality metric corresponding to a second set of UE attached to the wireless network base station through the first RF band layer.

19. The method of claim 18, wherein the first set of UE comprises an access device that distributes a network connection available through the wireless network base station with one or more UE that are in communication with the at least one UE; and the second set of UE comprises one or more mobile UE devices.

20. The method of claim 17, the method further comprising determining when the at least one UE is attached to the wireless network base station through the first RF band layer for a time greater than a predetermined time threshold.

* * * * *